(12) United States Patent
Carter et al.

(10) Patent No.: US 11,946,575 B2
(45) Date of Patent: Apr. 2, 2024

(54) DEVICE FOR PRE-POSITIONING A PROFILE CLAMP, AND CONNECTION SYSTEM

(71) Applicant: NORMA Germany GmbH, Maintal (DE)

(72) Inventors: Mark Carter, Newbury (GB); Mateusz Jarosz, Newbury (GB); Gary Williams, Newbury (GB)

(73) Assignee: Norma Germany GmbH, Maintal (DE)

( * ) Notice: Subject to any disclaimer, the term of this patent is extended or adjusted under 35 U.S.C. 154(b) by 220 days.

(21) Appl. No.: 17/611,747

(22) PCT Filed: May 8, 2020

(86) PCT No.: PCT/EP2020/062922
§ 371 (c)(1),
(2) Date: Nov. 16, 2021

(87) PCT Pub. No.: WO2020/229360
PCT Pub. Date: Nov. 19, 2020

(65) Prior Publication Data
US 2022/0235888 A1 Jul. 28, 2022

(30) Foreign Application Priority Data

May 16, 2019 (DE) ..................... 10 2019 112 884.6

(51) Int. Cl.
*F16L 23/00* (2006.01)
*F16L 23/08* (2006.01)

(52) U.S. Cl.
CPC ............. *F16L 23/003* (2013.01); *F16L 23/08* (2013.01)

(58) Field of Classification Search
CPC .......... F16L 23/003; F16L 23/08; F16L 23/10
(Continued)

(56) References Cited

U.S. PATENT DOCUMENTS

| 8,544,267 B2 | 10/2013 | Danielewicz et al. |
| 11,280,435 B2 | 3/2022 | Kayacik |

(Continued)

FOREIGN PATENT DOCUMENTS

| CN | 108700234 A | 10/2018 |
| DE | 102014002659 A1 | 8/2015 |
| WO | WO2017149104 A1 | 9/2017 |

OTHER PUBLICATIONS

International Search Report for International Application No. PCT/EP2020/062922 dated Oct. 12, 2020 (4 pages).

(Continued)

*Primary Examiner* — David Bochna
(74) *Attorney, Agent, or Firm* — REISING ETHINGTON, P.C.

(57) ABSTRACT

A device for pre-positioning a profile clamp for connecting line end pieces. The device has a bridge element of a profile clamp and a flange element on one of the line end pieces. The bridge element is designed to connect two clamp portions of the profile clamp along a bridge direction. The bridge element has a finger that extends away from the bridge element at least partly transversely to the bridge direction and has a free end portion. The flange element comprises a recess for receiving the free end portion. The recess blocks a movement of the free end portion along a circumferential direction of the flange element.

12 Claims, 3 Drawing Sheets

(58) Field of Classification Search
USPC .......................................................... 285/23
See application file for complete search history.

(56) References Cited

U.S. PATENT DOCUMENTS

| | | | | |
|---|---|---|---|---|
| 2004/0207195 | A1* | 10/2004 | Bowater | F16L 33/08 |
| | | | | 285/23 |
| 2014/0028014 | A1* | 1/2014 | Breitenbach | F16L 23/10 |
| | | | | 285/91 |
| 2014/0217728 | A1* | 8/2014 | Ghirardi | F16L 23/08 |
| | | | | 285/410 |
| 2017/0284578 | A1* | 10/2017 | Prevot | F16L 23/003 |
| 2018/0094755 | A1 | 4/2018 | Rigollet | |
| 2019/0093802 | A1 | 3/2019 | Paes et al. | |

OTHER PUBLICATIONS

English Translation of International Application No. PCT/EP2020/062922 dated Oct. 12, 2020 (3 pages).
1 Indian Office Action for Indian Application No. 202117051482 dated Apr. 11, 2022 (4 pages).
Korean Office Action for Korean Application No. 10-2021-7039793 dated Aug. 21, 2023 (3 pages).
English Translation of Korean Office Action for Korean Application No. 10-2021-7039793 dated Aug. 21, 2023 (2 pages).

* cited by examiner

DEVICE FOR PRE-POSITIONING A PROFILE CLAMP, AND CONNECTION SYSTEM

INTRODUCTION

The disclosure relates to a device for pre-positioning a profile clamp and a connection system.

Profile clamps are used to connect lines to one another. For this purpose, the profile clamps are placed around flanges of the line end pieces of the lines to be connected and are tensioned. To make the connection operation easier, twisting of an untensioned profile clamp on the line end piece should be avoided. Therefore, a tensioning device of the profile clamp remains in a defined position, so that the tensioning device remains in an easily accessible position. Furthermore, slipping of the profile clamps from the line end pieces can therefore be avoided.

For this purpose, for profile clamps having two half-clamps which are connected to each other by means of a joint, it is known from WO 2017/149104 A1 that the joint has a pin, which is connectable in a bracket connected to a line end piece. The bracket fixes the position of the profile clamp.

SUMMARY

An object of an embodiment of the disclosure can be considered to provide an improved device for pre-positioning a profile clamp, which can be produced more economically and more easily.

In a device for pre-positioning a profile clamp for connecting line end pieces, wherein the device has a bridge element of a profile clamp and a flange element on one of the line end pieces, wherein the bridge element is designed to connect two clamp portions of the profile clamp along a bridge direction, wherein the bridge element has a finger; the finger extends away from the bridge element at least partly transversely to the bridge direction and has a free end portion, the disclosure provides for the flange element to comprise a recess for receiving the free end portion, the recess blocking a movement of the free end portion along a circumferential direction of the flange element, wherein the finger has a spring portion, which is arranged between the bridge element and the free end portion, wherein the spring portion arranges the free end portion at a greater distance from the bridge portion in an untensioned state than in a tensioned state, in which the free end portion is arranged in the recess.

With the disclosure, without additional parts on the line end pieces to be connected, a connection between the profile clamp and the line end pieces is provided which avoids radial twisting of the profile clamp on the line end pieces to be connected. For this purpose, on the flange element of one of the two line end pieces to be connected, a recess is provided, which is able to receive the finger of the bridge element of the profile clamp. If the free end portion is arranged in the recess, the free end portion of the finger is held in position along the circumferential direction by the recess. The finger is designed to be rigid in the bridge direction, i.e. the finger cannot move relative to the bridge element in the bridge direction. This means that the finger and therefore the profile clamp cannot then be moved along the circumferential direction of the line end piece and therefore cannot be rotated about the line end piece. Therefore, no additional element is needed on the line end piece in order to block twisting about the line end piece. The free end portion is also resiliently mounted in relation to the bridge element by means of the spring element. Furthermore, the spring portion drives the free end portion into the recess when the free end portion is arranged in the recess. The effect of this is that the free end portion is driven into the recess as soon as the free end portion and the recess are aligned with each other, i.e. as soon as a profile clamp is arranged in the appropriate rotational position on the flange element. Furthermore, the free end portion is held in the recess as soon as it has been arranged in the recess and the profile clamp is arranged on the flange element. Therefore, the outlay during the production of the device is reduced. Furthermore, the saved element saves costs and weight.

The finger can extend at least partly away from the bridge element in an axial direction of the profile clamp.

Therefore, the finger does not project out of the bridge element directly between the clamp portions of a profile clamp. Therefore, jamming of the finger between the clamp portions when the clamp portions are moved toward each other is avoided. However, this does not rule out the finger extending between the clamp portions in its subsequent course.

Furthermore, the free end portion can at least partly overlap the bridge element in a radial direction of the profile clamp.

A further part of the free end portion can therefore extend back to the bridge element and engage around the clamp portions. Therefore, the finger can extend as far as a flange element when the bridge element and the flange portion are arranged to overlap.

The bridge element and the finger can be formed in one piece.

Therefore, the finger and the bridge element can be produced simply and economically in a few production steps. Thus, the bridge element can be punched out of a metal sheet, for example, together with the finger, the finger then being brought into its final shape by means of bending operations.

Furthermore, the recess can be a depression in the flange portion, the depression extending along a radial direction of the line end piece.

The free end portion can therefore be introduced into the recess in the radial direction of the line end piece. This simplifies the handling of the device.

The recess can be delimited in a circumferential direction of the line end piece by two opposite wall elements which are at a distance which is designed to match a width of the free end piece.

Therefore, the free end piece in the recess is held in the recess in a form-fitting manner in the circumferential direction of the line end piece by means of the two wall elements. This effectively avoids rotation of the profile clamp along the circumferential direction of the line end piece.

The bridge element can be a joint portion between the two clamp portions.

Therefore, the two clamp portions can be pivoted relative to each other by means of the bridge element in order to open the profile clamp. Furthermore, the bridge element is therefore multifunctional, since it has the finger with which, in conjunction with the recess on the flange element, rotation of the profile clamp in the circumferential direction of the line end piece is avoided.

The disclosure also relates to a connection system comprising a profile clamp having two clamp portions, a line end piece and a device as claimed in one of the preceding claims, wherein the device connects the profile clamp to the line end piece, wherein the profile clamp has the bridge element and the line end piece comprises the flange element.

Advantages and effects and also developments of embodiments of the connection system emerge from the advantages and effects and also developments of the device described above. Reference is therefore made to the preceding description in this regard.

Furthermore, the free end portion can be arranged in the recess when the profile clamp extends around the flange element.

The free end portion is therefore also arranged in the recess when the profile clamp extends around the flange element in the untensioned state. This effects pre-positioning even in the untensioned state of the profile clamp.

Furthermore, the bridge element can connect the two clamp portions to each other.

The bridge element can be arranged on the outside of the profile clamp in a radial direction of the profile clamp.

Therefore, the bridge element can be fixed to the clamp portions during the production of the profile clamp without great effort, in order to connect the clamp portions to each other.

Furthermore, the finger can extend at least partly between the two clamp portions.

Therefore, the finger can extend as far as a flange element when the bridge element and the flange portion are arranged to overlap.

In a radial direction of the profile clamp, a distance between the free end portion and the bridge element can correspond in magnitude at least to a distance which corresponds to a reduction in a diameter of the profile clamp when the profile clamp is tensioned.

Therefore, the finger extends with the free end portion as far as the recess when the profile clamp is arranged on the line end piece in the untensioned state. A displacement of the profile clamp in the radial direction by the distance which corresponds to a reduction in the diameter of the profile clamp therefore does not lead the free end portion out of the recess.

BRIEF DESCRIPTION OF THE FIGURES

Further features, details and advantages of the invention emerge from the wording of the claims and from the following description of exemplary embodiments with reference to the drawings, in which:

DETAILED DESCRIPTION

The device for pre-positioning a profile clamp will be designated in its entirety below by the designation 10.

Figure 1A:
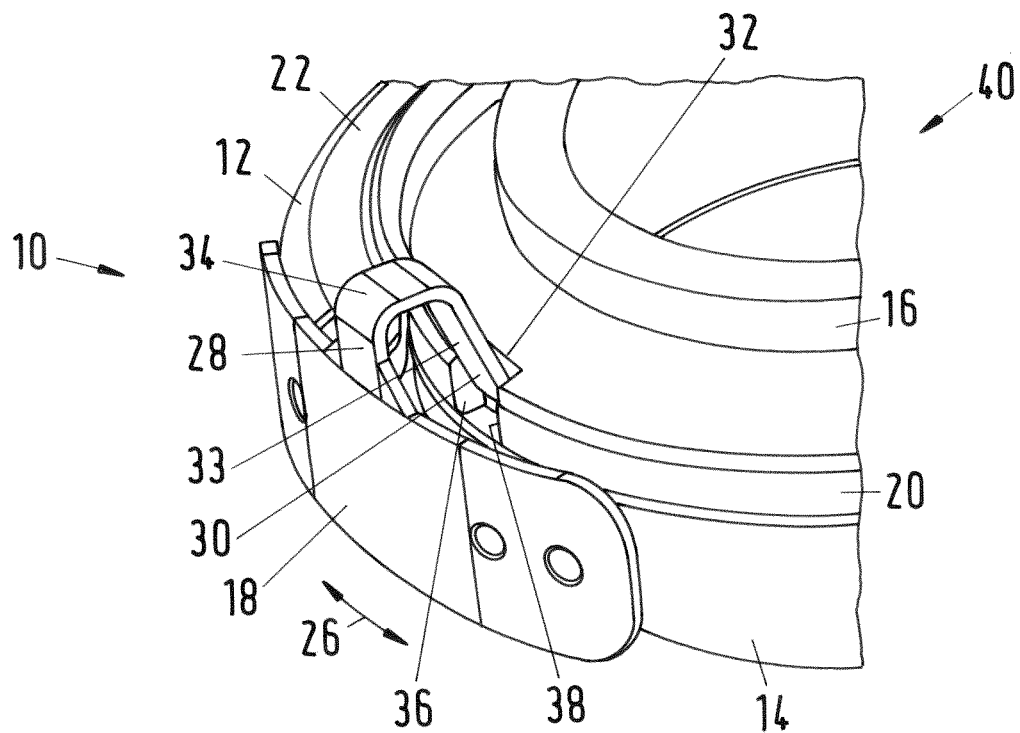
FIGS. 1a-c show various views of schematic illustrations of the device.

The device 10 according to FIG. 1a is used for pre-positioning a profile clamp 12, which is designed to connect line end pieces 14, 16. The profile clamp 12 has two clamp portions 22, 24. The device 10 has a bridge element 18 of a profile clamp 12 and a flange element 20 on one of the line end pieces 14, 16.

The flange element 20 is arranged on the line end piece 16 in FIG. 1a and is connected thereto. Alternatively, however, that can likewise be arranged on the line end piece 14 and connected thereto.

The flange element 20 has a recess 32, which extends along a radial direction of the line end piece 16. In the circumferential direction of the flange element 20, the recess 32 is delimited by the mutually opposite wall elements 36, 38. The recess 32 can be a depression in the flange element 20.

Figure 1B:
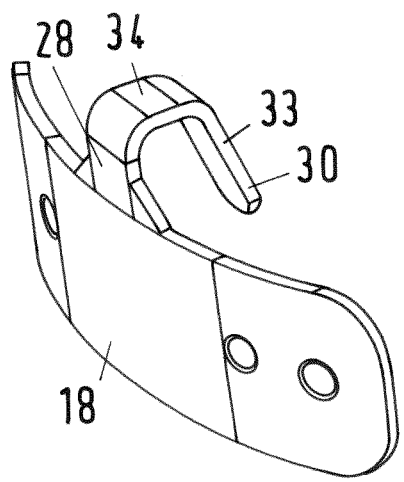

The bridge element 18, which is illustrated in more detail in FIG. 1b, connects the two clamp portions 22, 24 of the profile clamp 12. Furthermore, the bridge element 18 is arranged on the outside of the profile clamp 12 in the radial direction of the profile clamp 12.

The connection of the two clamp portions 22, 24 is made in a bridge direction 26. This means that the bridge element 18 extends along the bridge direction 26 between the two clamp portions 22, 24.

Figure 1C:
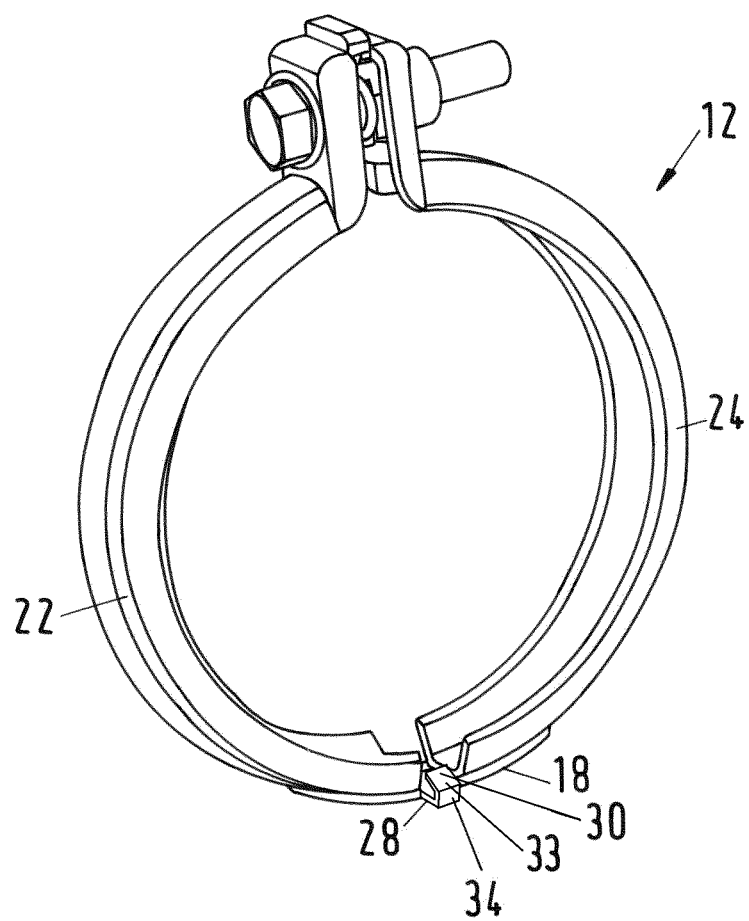

The bridge element 18 is a joint portion between the two clamp portions 22, 24. The clamp portions 22, 24 can be moved relative to each other in an articulated manner by means of the bridge element 18. Therefore, the profile clamp 12, which is illustrated in more detail in FIG. 1c, can be opened and closed by means of the bridge element 18.

Furthermore, the bridge element 18 has a finger 28, which extends away from the bridge element 18 at least transversely to the bridge direction 26. Along the course of the finger 28, the direction in which the finger 28 extends can change, i.e. the extension direction which the finger 28 has directly at the connection to the bridge element 18 can change along the finger 28.

According to FIG. 1b, the finger 28 initially extends away from the bridge element 18 in order then to make a change in direction. The finger 28 has a free end portion 30, which points in a different direction than the extension direction of the finger 28 directly at the connection of the finger 28 to the bridge element 18.

Between the free end portion 30 and the bridge element 18, the finger 28 also has a spring portion 34. The spring portion 34 can be U-shaped. A portion 33 of the finger 28 between the spring portion 34 and the free end portion 30 can function as a lever arm so that, during a displacement of the position of the free end portion 30 transverse to its extension direction, the spring portion 34 is tensioned.

The bridge element 18 and the finger 28 can be formed in one piece. This means that during the production of the bridge element 18, the finger 28 is produced at the same time. For this purpose, for example, the bridge element 18 with the finger 28 can be punched out of a metal sheet. After that, the spring portion 34 of the finger 28 can be formed. This can be effected by bending the finger 28.

If the bridge element 18 is arranged on the profile clamp 12 and connects the two clamp portions 22, 24 to each other, the finger 28 extends away from the bridge element 18, at least partly in an axial direction of the profile clamp 12. Furthermore, the free end portion 30 at least partly overlaps the bridge element 18 in a radial direction of the profile clamp 12 and extends at least partly between the two clamp portions 24, 26.

The free end portion 30 can be accommodated by the recess 32. For this purpose, the two wall elements 36, 38 have a distance in the circumferential direction of the flange element 20 which is designed to match a width of the free end portion 30. The distance between the two wall elements 36, 38 can correspond to the width of the free end portion 30 or be so large that the free end portion 30 can be inserted into the recess 32 and establishes contact with both wall elements 36, 38.

The free end portion 30 is therefore fixed in the circumferential direction of the flange element 20 by the two wall elements 36, 38 of the recess 32. Therefore, at the same time the bridge element 18 and the profile clamp 12 are fixed in the circumferential direction of the flange element 20 and therefore pre-positioned on the line end piece 16.

The above-described profile clamp 12 and the above-described line end piece 16 form with the device 10 a connection system which, in its entirety, is designated by the reference number 40 when the device 10 connects the profile clamp 12 to the line end piece 16. The free end portion 30 can be arranged in the recess 32 when the profile clamp 12 extends around the flange element 20.

Figure 2A:
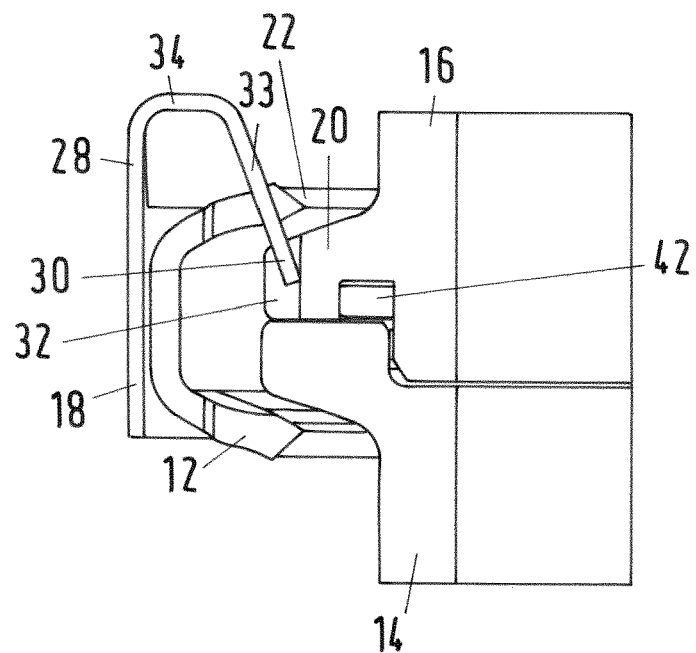
FIGS. 2a, b show a schematic illustration of the device in the untensioned and tensioned state.
Figure 2B:
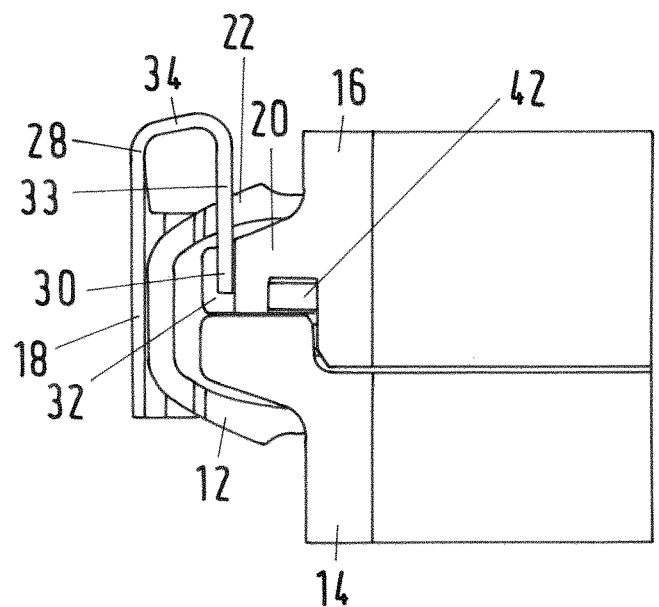

In FIGS. 2*a* and 2*b*, various states of the connection system 40 are illustrated. The two FIGS. 2*a* and 2*b* constitute a sectional illustration through two line end pieces 14, 16 that are coupled to each other, between which a seal 42 is arranged. Furthermore, the profile clamp 12 is arranged around both line end pieces 14, 16 and in particular around the flange element 20.

In FIG. 2*a*, the profile clamp 12 is in an untensioned state. The recess 32 and the finger 28 are aligned with each other, so that the free end portion 30 and the recess 32 are aligned with each other. The finger 28 is designed such that, in the untensioned state of the profile clamp 12, the free end portion 30 is arranged in the recess 32.

The portion 33 between the free end portion 30 and the spring portion 34 is arranged at an angle to an axial direction of the profile clamp. The angle of the portion 33 can lie, for example, between 60° and 20° relative to the axial direction of the profile clamp when the spring portion 34 is untensioned.

In FIG. 2*a*, the free end portion 30 is arranged in the recess 32. A wall of the recess 32 that runs along the circumferential direction of the flange element 20 touches the free end portion 30. A force which forces the free end portion 30 by a small amount in the direction of the bridge element 18 can act on the free end portion 30. This causes a slight tension of the spring portion 34. The spring portion 34 drives the free end portion 30 in the radial direction of the profile clamp 12 toward the flange element 20.

As the profile clamp 12 is tensioned, the diameter of the profile clamp 12 is reduced, so that the distance between the profile clamp 12 and the flange element 20 is reduced. This state is illustrated in FIG. 2*b*. As a result of the reduction in the diameter of the profile clamp 12, the distance of the bridge element 18 from the flange element 20 and therefore from the recess 32 is also reduced. As a result, the free end portion 30 of the finger 28 is displaced further in the radial direction in the direction of the bridge element 18. This effects an increase in the tension of the spring portion 34. As compared with the state which is illustrated in FIG. 2*a*, the finger 28 in FIG. 2*b* is deformed. In FIG. 2*b*, the spring portion 34 drives the free end portion 30 into the recess 32 in the direction of the flange element 20 with a greater force than in the state in FIG. 2*a*.

Therefore, a distance in the radial direction of the profile clamp 12 between the free end portion 30 and the bridge element 18 corresponds in magnitude at least to the distance which corresponds to a reduction in the diameter of the profile clamp 12 as the profile clamp 12 is tensioned.

The invention is not restricted to one of the previously described embodiments but can be modified in many ways.

All the features and advantages resulting from the claims, the description and the drawing, including design details, physical arrangements and method steps, can be essential to the invention, both on their own and in the various combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE SIGNS

10 Device
12 Profile clamp
14 Line end piece
16 Line end piece
18 Bridge element
20 Flange element
22 Clamp portion
24 Clamp portion
26 Bridge direction
28 Finger
30 Free end portion
32 Recess
33 Portion
34 Spring portion
36 Wall element
38 Wall element
40 Connection system
42 Seal
10 Device
12 Profile clamp
14 Line end piece
16 Line end piece
18 Bridge element
20 Flange element

The invention claimed is:

1. A device for pre-positioning a profile clamp for connecting line end pieces, wherein the device has a bridge element of a profile clamp and a flange element on one of the line end pieces, wherein the bridge element is designed to connect two clamp portions of the profile clamp along a bridge direction, wherein the bridge element has a finger; the finger extends away from the bridge element at least partly transversely to the bridge direction and has a free end portion, wherein the flange element comprises a recess for receiving the free end portion, wherein the recess blocks a movement of the free end portion along a circumferential direction of the flange element, wherein the finger has a spring portion, which is arranged between the bridge element and the free end portion, wherein the spring portion arranges the free end portion at a greater distance from the bridge element in an untensioned state than in a tensioned state, in which the free end portion is arranged in the recess, wherein the free end portion at least partly overlaps the bridge element in a radial direction of the profile clamp.

2. The device as claimed in claim 1, wherein the finger extends at least partly away from the bridge element in an axial direction of the profile clamp.

3. The device as claimed in claim 1, wherein the bridge element and the finger are formed in one piece.

4. The device as claimed in claim 1, wherein the recess is delimited in a circumferential direction of the line end piece by two opposite wall elements which are at a distance which is designed to match a width of the free end portion.

5. The device as claimed in claim 1, wherein the bridge element is a joint portion between the two clamp portions.

6. A connection system comprising a profile clamp having two clamp portions, a line end piece and a device as claimed in claim 1, wherein the device connects the profile clamp to the line end piece, wherein the profile clamp has the bridge element and the line end piece comprises the flange element.

7. The connection system as claimed in claim 6, wherein the end portion is arranged in the recess when the profile clamp extends around the flange element.

8. The connection system as claimed in claim 6, wherein the bridge element connects the two clamp portions to each other.

9. The connection system as claimed in claim 8, wherein the bridge element is arranged on the outside of the profile clamp in a radial direction of the profile clamp.

10. The connection system as claimed in claim 6, wherein in a radial direction of the profile clamp, a distance between the free end portion and the bridge element corresponds in magnitude at least to a distance which corresponds to a reduction in a diameter of the profile clamp when the profile clamp is tensioned.

11. A device for pre-positioning a profile clamp for connecting line end pieces, wherein the device has a bridge element of a profile clamp and a flange element on one of the line end pieces, wherein the bridge element is designed to connect two clamp portions of the profile clamp along a bridge direction, wherein the bridge element has a finger; the finger extends away from the bridge element at least partly transversely to the bridge direction and has a free end portion, wherein the flange element comprises a recess for receiving the free end portion, wherein the recess blocks a movement of the free end portion along a circumferential direction of the flange element, wherein the finger has a spring portion, which is arranged between the bridge element and the free end portion, wherein the spring portion arranges the free end portion at a greater distance from the bridge element in an untensioned state than in a tensioned state, in which the free end portion is arranged in the recess, wherein the recess is a depression in the flange element, the depression extending along a radial direction of the line end piece.

12. A connection system comprising a profile clamp having two clamp portions, a line end piece and a device for pre-positioning a profile clamp for connecting line end pieces, wherein the device has a bridge element of a profile clamp and a flange element on one of the line end pieces, wherein the bridge element is designed to connect two clamp portions of the profile clamp along a bridge direction, wherein the bridge element has a finger; the finger extends away from the bridge element at least partly transversely to the bridge direction and has a free end portion, wherein the flange element comprises a recess for receiving the free end portion, wherein the recess blocks a movement of the free end portion along a circumferential direction of the flange element, wherein the finger has a spring portion, which is arranged between the bridge element and the free end portion, wherein the spring portion arranges the free end portion at a greater distance from the bridge element in an untensioned state than in a tensioned state, in which the free end portion is arranged in the recess, wherein the device connects the profile clamp to the line end piece, wherein the profile clamp has the bridge element and the line end piece comprises the flange element, wherein the finger extends at least partly between the two clamp portions.

\* \* \* \* \*